United States Patent [19]
Demiryont

[11] Patent Number: 4,960,323
[45] Date of Patent: Oct. 2, 1990

[54] METHOD FOR MAINTAINING THE ELECTROCHROMIC ACTIVITY OF AN ELECTROCHROMIC MATERIAL

[75] Inventor: Hulya Demiryont, Dearborn, Mich.

[73] Assignee: Ford Motor Company, Dearborn, Mich.

[21] Appl. No.: 253,657

[22] Filed: Oct. 5, 1988

[51] Int. Cl.$^5$ .............................. G02F 1/01
[52] U.S. Cl. ................................. 350/357
[58] Field of Search ........................ 350/357

[56] References Cited

U.S. PATENT DOCUMENTS

| | | | |
|---|---|---|---|
| 3,521,941 | 7/1970 | Deb et al. | 350/357 |
| 4,170,406 | 10/1979 | Giglia et al. | 350/357 |
| 4,194,812 | 3/1980 | Hara et al. | 350/357 |
| 4,344,674 | 8/1982 | Giglia | 350/357 |
| 4,350,414 | 9/1982 | Takahashi et al. | 350/357 |
| 4,435,048 | 3/1984 | Kamimori et al. | 350/357 |
| 4,505,538 | 3/1985 | Toussaint et al. | 350/357 |
| 4,645,307 | 2/1987 | Miyamoto et al. | 350/357 |
| 4,645,308 | 2/1987 | Tracy et al. | 350/357 |
| 4,762,401 | 8/1988 | Baucke et al. | 350/357 |

FOREIGN PATENT DOCUMENTS

| | | | |
|---|---|---|---|
| 0073756 | 6/1977 | Japan | 350/357 |
| 0037050 | 4/1978 | Japan | 350/357 |
| 0007956 | 1/1979 | Japan | 350/357 |
| 0046290 | 3/1982 | Japan | 350/357 |
| 0242429 | 12/1985 | Japan | 350/357 |
| 0186233 | 8/1987 | Japan | 350/357 |

OTHER PUBLICATIONS

*The Journal of Applied Physics*, 53(1), Jan., 1982, entitled "Prussian-Blue-Modified Electrodes: An Application for a Stable Electrochromic Display Device".

Primary Examiner—Eugene R. LaRoche
Assistant Examiner—Michael B. Shingleton
Attorney, Agent, or Firm—Lorraine S. Melotik; Roger L. May

[57] ABSTRACT

This specification teaches a method for maintaining the electrochromic activity of an electrochromic material positioned between electrodes of an electrochromic device. The method disclosed for maintaining the electrochromic activity of the electrochromic material comprises applying a voltage across the electrodes of such level so to maintain an absolute single polarity charge abundance in the electrochromic material sufficient to keep it in an electrochromic state.

8 Claims, 2 Drawing Sheets

METHOD FOR MAINTAINING THE ELECTROCHROMIC ACTIVITY OF AN ELECTROCHROMIC MATERIAL

BACKGROUND OF THE INVENTION

1. Field of the Invention

This invention relates to a method for maintaining the electrochromic activity of an electrochromic material. The electrochromic material may be either an anodic electrochromic material or a cathodic electrochromic material.

2. Discussion of the Related Art

Reference is made copending U.S. patent application Ser. No. 137,633, filed Dec. 24, 1987, to Demiryont for "NEW ELECTROCHROMIC MATERIAL, METHOD OF MAKING, AND NEW ELECTROCHROMIC DEVICE" for a complete discussion of electrochromic activity of both the anodic and the cathodic variety. That application is hereby incorporated by reference for such teachings.

Most simply, an electrochromic device comprises an electrochromic material layer in contact with an ion conductor material layer which is a source of ions. The electrochromic material is an insulator (dielectric material). These two layers are positioned between electrodes, at least one of which is transparent. Because the electrochromic material is a dielectric material, when a voltage is applied across the electrodes, an electric field is generated within the electrochromic material. This electric field can cause chemical changes and corresponding color changes in the electrochromic material. The electrochromic material may change color, e.g., from colorless to blue, when it "switches" from one electrochromic state to another. By reversing the polarity of the applied voltage and hence the electric field, the electrochromic material can be switched back, e.g., from blue to colorless, that is, from its "colored" to its "bleached" state. Electrochromic devices are well known in the art and have been disclosed for example, in U.S. Pat. Nos. 3,521,941, 4,170,406, 4,194,812, 4,344,674, 4,505,538 and 4,645,308.

Optimally, the electrochromic material has good electrochromic activity and maintains this activity during a substantially large number of switches (cycles) of the electrochromic material. Such electrochromic activity includes the ability of the electrochromic material to be repeatedly colored during different cycles to the same intensity of color, should that be desired. Still further, the material should maintain the ability to switch rapidly in the presence of an electric field of reversing polarity, and at the same magnitude of positive or negative applied voltage, even after a large number of switches.

The electrochromic activity of an electrochromic material not subjected to the method of this invention tends to decrease when it is repeatedly switched between its various electrochromic states. For example, the intensity of the color which can be brought about in the electrochromic material is generally greatly decreased as the material is switched. In such cases, in an attempt to bring about the same intensity of color as in the previous cycles, the magnitude of the applied voltage is increased. This generally only provides a temporary correction of the situation. In time, even increasing the magnitude of the applied voltage generally does not provide the previous intensity of color. Another problem with electrochromic materials not subjected to this invention is that switching generally takes longer with each additional cycle.

Good cathodic electrochromic materials should be of the general formula: $MO_x$, where M is a variable valence metal and x is a number less than that which will provide a stoichiometric compound. That is, for good cathodic electrochromic materials the compound should be oxygen deficient, i.e., in a reduced state. Thus, as described in copending application U.S. Ser. No. 138,234 to Demiryont filed Dec. 28, 1987, $WO_x$, with x less than 3 is a good cathodic electrochromic material while stoichiometric tungsten oxide, $WO_3$, is not. (Presently $WO_3$ is understood to be electrochromic but of less than desirable electrochromic quality.) Similarly, as described in copending application U.S. Ser. No. 179,825 to Demiryont filed Apr. 11, 1988, $VO_x$ with x less than 2.5 is a good cathodic electrochromic material, while stoichiometric $V_2O_5$ is not an electrochromic material. In order for such an oxygen deficient, cathodic electrochromic material to maintain its electrochromic activity during switching, it needs to be maintained in its oxygen deficient (reduced) state.

In the presence of oxygen or oxygen providing materials (as may be present in an ion conductive layer), the oxygen deficient electrochromic material may undesirably oxidize to its stoichiometric form. When this happens, the electrochromic activity diminishes. Some cathodic electrochromic materials such as reduced lead oxide and reduced bismuth oxide are highly unstable in their reduced state. For these materials, oxidation may begin as soon as the electrochromic material is subjected to an environment comprising oxygen or oxygen providing materials (e.g., $O_2$ or $H_2O$), even absent an applied voltage. Other cathodic electrochromic materials, such as reduced tungsten oxide, are generally stable in their reduced state in the presence of an environment comprising oxygen or oxygen providing materials, absent application of a voltage of positive polarity to the material. Oxidation appears to begin only after this kind of electrochromic material is subjected to an oxidizing environment and to an application of a voltage of positive polarity, as occurs during switching of an electrochromic material. As disclosed above, oxidation of reduced tungsten oxide brings about a corresponding decrease in the electrochromic activity of the tungsten oxide.

Likewise, it is believed that subjecting a fully oxidized anodic electrochromic material to a reducing environment brings about reduction of the electrochromic material with a corresponding decrease in its electrochromic activity.

It thus would be desirable to provide a method for maintaining the electrochromic activity of an electrochromic material at least during operation of the device and, if necessary, even before the device is subjected to operation.

This specification teaches a method for maintaining the electrochromic activity of an electrochromic material over a prolonged period of time during which it is subjected to repeated switching (cycling). The electrochromic activity may be maintained for either an anodic electrochromic material or a cathodic electrochromic material.

A search conducted on the subject matter of this specification resulted in the citation of U.S. Pat. Nos. 4,350,414; 4,435,048; and 4,645,308. Also cited was an article from *The Journal of Applied Physics*, 53(1), January 1982, entitled "Prussian-Blue-Modified Electrodes: An Application For A Stable Electrochromic Display Device". None of the cited material teaches or suggests a method such as to be disclosed herein for maintaining the electrochromic activity of an electrochromic material. However, the material cited will be discussed individually below.

U.S. Pat. No. 4,350,414 issued on Sept. 21, 1982 for an "All Solid-State Electrochromic Device". The all solid-state electrochromic device disclosed features a structure composed of an oxidizable film capable of a redox reaction which shows a change in the transmittance in a certain wavelength range in the oxidized state. A reducible film is also provided which is capable of a redox reaction which shows a change the transmittance in a certain wavelength range in the reduced state. An insulating film is provided between the aforementioned films. The insulating film allows proton conduction but prohibits electron conduction. A pair of electrodes are provided between which the mentioned three films are positioned.

U.S. Pat. No. 4,435,048 issued on Mar. 6, 1984, for an "Electro-Optical Device and Electro-Optical Light Controlling Device." The patent discloses an electro-optical device comprising an electrolyte layer held between a pair of electrodes and an electrochromic material placed on at least one of the electrodes. The electrolyte layer comprises an organic material and a chelating agent and an electro-optical light controlling device comprising an electrolyte layer held between a pair of transmissive electrodes and an electrochromic material placed on at least one of the electrodes. The electrolyte layer comprises a nonliquid material of an adhesive or tacky high polymer and a material having coordinating function to a metal.

U.S. Pat. No. 4,645,308 issued on Feb. 24, 1987 for a "Low Voltage Solid-State Lateral Coloration Electrochromic Device". The patent discloses a solid-state transition metal oxide device comprising a plurality of layers having a predisposed orientation including an electrochromic oxide layer. Conductive material including anode and cathode contacts are secured to the device. Coloration is actuated within the electrochromic oxide layer after the application of a predetermined potential between the contacts. The coloration action is adapted to sweep or dynamically extend the length of the electrochromic oxide layer.

The Journal of Applied Physics article described an electrochromic display device based on a prussian-blue-modified electrode. Prussian blues are deposited electrochemically in a solution of ferric-ferricyanide. Current flow at +0.2 and +1.0V is due to a reduction of ferric ions and the oxidation of ferrous ions in the prussian-blue coating respectively.

SUMMARY OF THE INVENTION

This invention is directed to a method for maintaining the electrochromic activity of an electrochromic material provided between electrodes of an electrochromic device. This method comprises applying a voltage, at least during operation of the device, across said electrodes of such level as to continuously maintain an absolute single polarity charge abundance in the electrochromic material sufficient to keep said electrochromic material in an electrochromic state. When the electrochromic material is a cathodic electrochromic material, a negative charge abundance is maintained in the material. On the other hand, when the electrochromic material is an anodic electrochromic material, a positive charge abundance is maintained in the anodic electrochromic material.

According to another aspect of the invention, A method of maintaining the electrochromic activity of a cathodic electrochromic material provided between electrodes of an electrochromic device is disclosed. This method comprises applying a voltage, at least during operation of the device, across said electrodes of such level that the absolute value of an applied negative voltage is greater than the absolute value of an applied positive voltage, so as to continuously maintain a negative charge abundance in the cathodic electrochromic material sufficient to keep the cathodic electrochromic material in an electrochromic state.

According to a further aspect of this invention, a method is disclosed of maintaining the electrochromic activity of an anodic electrochromic material provided between electrodes of an electrochromic device. This method comprises applying a voltage, at least during operation of the device, across the electrodes of such level that the absolute value of an applied positive voltage is greater than the absolute value of an applied negative voltage, so as to continuously maintain a positive charge abundance in the anodic electrochromic material sufficient to keep the anodic electrochromic material in an electrochromic state.

This invention is yet another aspect is directed to a method of operating an electrochromic device to maintain the electrochromic activity of an electrochromic material provided therein. This method comprises forming an electrochromic device comprising (1) electrodes and (2) electrochromic material located therebetween, and applying a voltage across the electrodes as disclosed above to keep the electrochromic material in an electrochromic state.

Still further, this invention is directed to an electrochromic device capable of maintaining the electrochromic activity of an electrochromic material located therein. The device comprises electrodes and electrochromic material located therebetween; and an external electrical circuit means coupled to the electrochromic device for applying a voltage, at least during operation of the device, across said electrodes of such level as to continuously maintain an absolute single polarity charge abundance in the electrochromic material sufficient to keep said electrochromic material in an electrochromic state. The polarity charge abundance may be maintained by applying voltages as described above.

In the situation where the electrochromic device is a cathodic electrochromic device (i.e., contains cathodic electrochromic material), a negative charge abundance is maintained in the electrochromic material. On the other hand, when the electrochromic device is an anodic electrochromic device, a positive charge abundance is maintained in the electrochromic material.

Surprisingly it has been found, that an electrochromic material of an electrochromic device subjected to the method of this invention maintains its electrochromic activity even after 140,000 cycles. In contrast, a similar device cycled conventionally not according to the method of this invention displayed substantial degradation of the electrochromic activity of the electrochromic material after only about two hundred cycles.

While not wishing to be bound by theory, it is believed that by maintaining a negative charge abundance in the case of a cathodic electrochromic material causes the electrochromic material to repel negative ions such as O= and OH− which, if present, could undesirably cause oxidation of the cathodic electrochromic material. Similarly, in the case of an anodic electrochromic material, maintaining a positive charge abundance on this material causes the anodic electrochromic material to repel positive ions such as H+ which, if present, could cause undesirably cause reduction of the anodic electrochromic material. While the above theory is presented in an attempt to explain the invention disclosed herein, neither its understanding nor its validity is necessary for the practice of the claimed invention.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures, and in which:

DETAILED DESCRIPTION OF THE PREFERRED EMBODIMENTS

Figure 1:
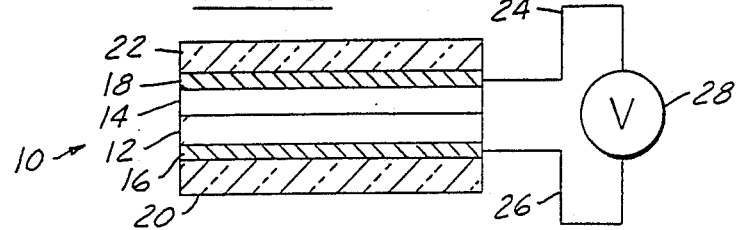
FIG. 1 is a schematic representation of an embodiment of an operating electrochromic device of this invention.

This invention is directed to a method of maintaining the electrochromic activity of an electrochromic material provided between electrodes of an electrochromic device. As disclosed above, the method comprises applying a voltage, at least during operation of the device, across the electrodes of such level as to continuously maintain an absolute single polarity charge abundance in the electrochromic material sufficient to keep the electrochromic material in an electrochromic state.

The voltage applied according to this invention to maintain the electrochromic activity of an electrochromic material maintains an absolute single polarity charge abundance in the electrochromic material. By this it is meant that at least at all time during the operation of the device, the electrochromic material has an absolute single polarity charge abundance therein which is either a negative charge abundance in the case of a cathodic electrochromic material or a positive charge abundance in the case of an anodic electrochromic material.

The method of this invention is applicable to maintain any electrochromic material, many of which a well known to those skilled in the art and commercially available. Cathodic electrochromic materials include non-stoichiometric (i.e., oxygen deficient) metal oxides wherein the metal has variable oxidation states. Exemplary of such cathodic electrochromic materials whose electrochromic activity may be maintained according to this invention are those selected from the group comprising tungsten oxide, molybdenum oxide, vanadium oxide, titanium oxide, lead oxide, and bismuth oxide and compatible mixtures of any of them. Anodic electrochromic materials include full oxidized compounds comprising metal wherein the metal has variable oxidation states. Exemplary of such anodic electrochromic materials are iridium oxide, and nickel hydroxide and compatible mixtures of any of them. Preferred electrochromic materials for use in electrochromic devices which may practice this invention include non-stoichiometric, oxygen deficient tungsten oxide as the cathodic electrochromic material and fully oxidized iridium oxide as an anodic electrochromic material.

According to the method of this invention, if the electrochromic material is a cathodic electrochromic material, it must be kept in a reduced state by an applied voltage. Thus, the applied voltage generates a negative charge abundance in the electrochromic material in order to keep it in its reduced state. On the other hand, if the electrochromic material is an anodic electrochromic material, it must be kept in an oxidized state. In this case, the applied voltage is one which generates a positive charge abundance in the electrochromic material so that it remains in its oxidized state.

This invention also teaches a method of operating an electrochromic device to maintain the electrochromic activity of an electrochromic material provided therein, which method comprises: forming an electrochromic device comprising two electrodes and therebetween an electrochromic material; and applying a voltage, at least during operation of the device, across the electrodes of such level as to continuously maintain an absolute single polarity charge abundance in the electrochromic material sufficient to keep the electrochromic material in an electrochromic state.

In this manner the electrochromic activity of the electrochromic material of the device is maintained. As disclosed above, in the situation where the electrochromic device is a cathodic electrochromic device, the voltage is of a polarity which maintains a negative charge abundance in the electrochromic material. On the other hand, when the electrochromic device is an anodic electrochromic device, the voltage is of a polarity which maintains a positive charge abundance in the electrochromic material.

The invention will be further understood from the following discussion which includes reference to the figures. The discussion is not intended to be a limitation upon the broader principles of my invention, and while preferred materials are used to show the invention, it does not mean that other materials cannot be used in the invention.

Reference is now made to FIG. 1 wherein one embodiment of an electrochromic device is generally identified by the numeral 10. The device includes an electrochromic material layer 12 and an ion conductive material layer 14 positioned between two electrode layers respectively designated 16 and 18. While in the embodiment of FIG. 1, the electrochromic material and ion conductive material are shown as layers, these two materials could be intermixed to form one layer comprising the electrochromic material and the ion conductive material i.e., a matrix material. Additionally, while not shown in FIG. 1, the device could further comprise, e.g., a counter electrode layer positioned between electrode layer 18 and ion conductive material layer 14. As seen from FIG. 1, layers: 16, 12, 14, and 18 are positioned between two glass substrates respectively designated 20 and 22 to form an electrochromic device. In accordance with the teachings of a preferred embodiment, and to illustrate a cathodic electrochromic material, the electrochromic material 12 comprises not fully oxidized tungsten oxide. As discussed above, fully oxidized tungsten oxide, that is, $WO_3$, is not a good electrochromic material. However, tungsten oxide of the formula $WO_x$ where x is less than 3, is generally an excellent electrochromic material. As discussed hereinbefore, the quality of electrochromic activity is related to fast switching, high color contrast between the bleached and colored states, long lasting memory and the maintaining of such properties over an extended period of switching (long life).

In accordance with the teachings of a preferred embodiment, the electrodes 16 and 18 are transparent electrodes. In this manner, the electrochromic material 12 is viewable through the electrodes 16 and 18 so that one may see the color change as a voltage is applied across the electrodes. Electrodes 16 and 18 are respectively connected by leads 26 and 24 to an electrical voltage providing structure 28.

As noted above, electrochromic devices are well known in the arts and described in numerous patents, some of which have been listed above. Those patents are hereby expressly incorporated herein for their teaching relative such devices, in particular with respect to components such as electrodes, electrochromic materials, ion conductive materials, and fabrication and operation of electrochromic devices. As is known to those skilled the art, such devices generally comprise at least one transparent electrode. If a transparent device is desired, both electrodes would be transparent. If, on the other hand, a electrochromic mirror device or display device is desired, one of the electrodes would be opaque, in the case of the mirror, it would also be reflective. The ion conductive material may be solid, gel or liquid as known to those skilled in the art. This material is an insulator and generally is transparent (colorless) so as to allow viewing of the color change of the electrochromic material.

It is intended that any electrochromic material provided between the electrodes of an electrochromic device could practice the method of this invention in order to maintain the electrochromic activity of the electrochromic material employed therein. This method could be used to maintain the electrochromic activity of an electrochromic material in a device not yet containing an ion conductive material, since the space provided in the device for the ion conductive material could allow an oxidizing or reducing environment to be present near the electrochromic material.

Figure 2:
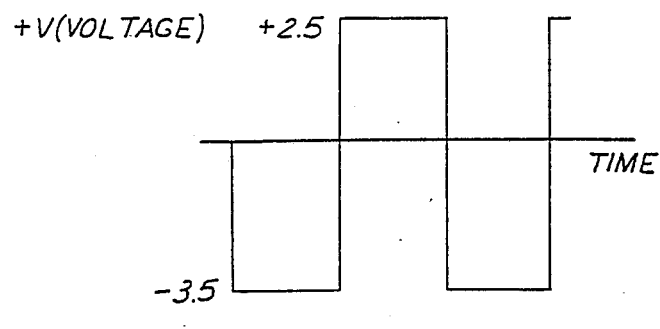
FIGS. 2, 3 and 4 are graphical presentations representative of the operation of the electrochromic device of FIG. 1 when an asymmetrical wave form voltage is applied thereto.

In accordance with the teachings of a first disclosed embodiment, the electrical voltage providing structure 28 generates a square wave voltage of asymmetrical configuration such as depicted in FIG. 2. In this case, the voltage varies from a $-3.5$ volts to a $+2.5$ on alternate cycles of the electrical voltage providing structure.

Figure 3:
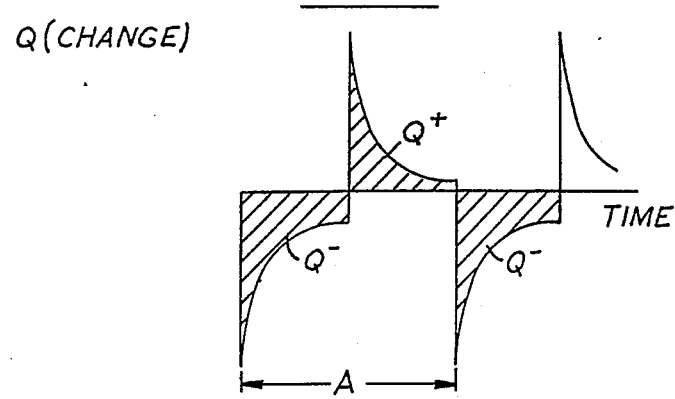

The resulting charge developed by the electrical voltage providing structure 22 operating on an asymmetrical system is shown in FIG. 3. In FIG. 3, a single cycle designated by the letter A shows that the negative charge in the cathodic electrochromic material is substantially more than the positive charge developed in this electrochromic material during each cycle of the electrical voltage providing structure. In this manner there is a negative charge abundance at all times in the cathodic electrochromic material. With the generation of a negative charge abundance, negative ions, such as oxygen ions, are repelled from the electrochromic material whereby it remains in its reduced or electrochromic state. Otherwise the electrochromic material could slowly oxidize to its fully oxidized state which is not a good electrochromic material.

Figure 4:
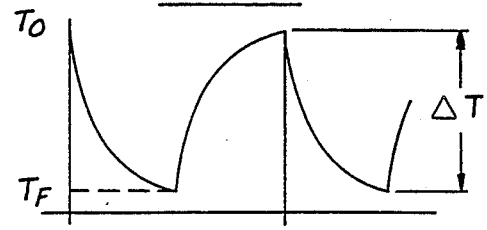

FIG. 4 is a graphical presentation of the change in transmission (T) of visible light (radiation), of the electrochromic material which occurs in the electrochromic material as a result of the voltage applied thereto as defined in FIG. 2. During the half of the cycle when a voltage of negative polarity is being applied to electrode 17 adjacent the electrochromic material, the electrochromic material is switched from its bleached (uncolored) state ($T_o$) to its colored (darkened) state ($T_F$) During this part of the cycle it can be seen from FIG. 3 that a negative charge abundance is maintained in the electrochromic material. During the second half of the cycle, positive charge is being added to the electrochromic material whereby the electrochromic material 12 is transformed from its colored (darkened) state ($T_F$) to its bleached (uncolored) state ($T_o$). During this second half of the cycle the total negative charge abundance is reduced. A negative charge abundance is still maintained in the material, however, since (as can be seen from FIG. 3) the negative charge provided during the first half of the cycle is greater than the positive charge provided during the second half of the cycle. During the first half of the next cycle, as negative charge is being added to the recently depleted but still negative charge abundance in the electrochromic material, the electrochromic material is once again switched from its uncolored state to its colored state ($T_F$). As would be apparent to one skilled in the art in view of the present disclosure, optical transmission decreases during the coloring part of the cycle and increases during the bleaching part of the cycle.

In the first described embodiment, the electrochromic material selected is a cathodic electrochromic material and it is kept in its electrochromic state by generating a negative charge abundance in the electrochromic material at all times. On the other hand, if the electrochromic material is an anodic electrochromic material, such as iridium oxide, then the system operates in just the opposite way. For that type of material, the positive voltage would be greater than the negative voltage and thus the positive charge built up within the electrochromic material would be substantially greater than the negative charges cyclically applied thereto. Thus, in the case of an anodic electrochromic material, the voltage must generate and maintain a positive charge abundance in the electrochromic material at all times during its operation.

Figure 5:
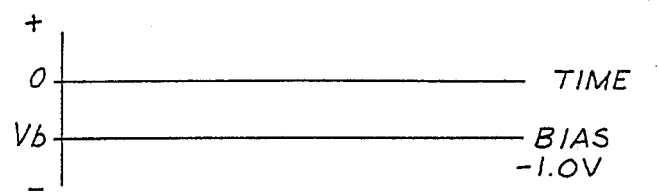
FIGS. 5, 6 and 7 are graphical presentations representative of the operation of the electrochromic device of FIG. 1 in a situation in which both a constant biasing voltage and a symmetrical stepped voltage are applied thereto for operation of the device.

A slightly different form of voltage is developed by the electrical voltage providing structure 28 as another form of the invention. In this case, the electrical voltage providing structure provides a continuous biasing voltage such as illustrated in FIG. 5. In other words, in the case of a cathodic electrochromic material, such as tungsten oxide, a constant negative bias voltage of about one volt would be applied constantly by the electric voltage providing structure to the electrodes 14 and 16 and thus to the electrochromic material 12.

Figure 6:
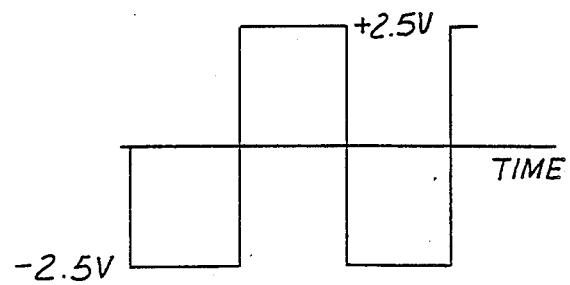
Figure 7:
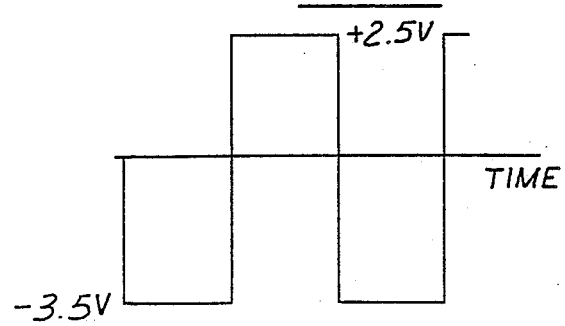

In order to obtain the electrochromic switching of the electrochromic material, at those times when switching was desired, a symmetrical square wave voltage is also applied along with the biasing voltage. The square wave voltage is −2.5 and +2.5 volts as shown in FIG. 6 with the resultant voltage shown in FIG. 7. It can be seen from FIG. 7 that at times when the square wave voltage is applied, the electrochromic material 12 is cycled between −3.5 volts to +2.5 volts as was the case discussed previously above with FIG. 2. Of course, with the application of this voltage, the result in the electrochromic material would be the same as discussed previously in conjunction with FIGS. 3 and 4. Therefore, no further discussion will be made thereof. Thus, the application of a continuous biasing voltage plus an intermittent square wave voltages can result in the same operation of the device as described in conjunction with the application of only an asymmetrical square wave voltage.

While particular embodiments of the invention have been illustrated and described, it will be obvious to those skilled in the art in view of the present disclosure that various changes and modifications may be made without departing from the invention. For example, other wave forms such as triangular, trapezoidal, sinusoidal, sawtooth, etc. may be used so long as the voltage generates the required charge abundance in the electrochromic material.

Thus, as described above, the negative charge abundance may be maintained in a cathodic electrochromic material by applying a voltage, at least during operation of the device, across the electrodes of such level that the absolute value of an applied negative voltage is greater than the absolute value of an applied positive voltage. One way of doing this is by applying a voltage which consists essentially of a voltage of reversible polarity of such level that the absolute value of its negative voltage is greater than the absolute value of its positive voltage. Another way to maintain the negative charge abundance is to apply a voltage which comprises (i) a negative biasing voltage and (ii) a voltage of reversible polarity of such level that the absolute value of its negative voltage is equal to the absolute value of its positive voltage.

A positive charge abundance may be maintained in an anodic electrochromic material by applying a voltage, at least during operation of the device, across the electrodes of such level that the absolute value of an applied positive voltage is greater than the absolute value of an applied negative voltage. One way of doing this is by applying a voltage which consists essentially of a voltage of reversible polarity of such level that the absolute value of its positive voltage is greater than the absolute value of its negative voltage. Another way to maintain the positive charge abundance is to apply a voltage which comprises (i) a positive biasing voltage and (ii) a voltage of reversible polarity of such level that the absolute value of its positive voltage is equal to the absolute value of its negative voltage. Still other ways of maintaining the desired negative charge abundance or positive charge abundance will be apparent to those skilled in the art in view of the present disclosure. For example, for a cathodic material, the applied voltage may comprise (i) a negative biasing voltage applied together with (ii) a voltage of reversible polarity of such level that the absolute value of its negative voltage is greater than the absolute value of its positive voltage.

In the case of a cathodic electrochromic material, according to this invention a voltage is applied, at least during operation of the device, across the electrodes of such lever so to maintain an absolute single negative polarity charge abundance in the electrochromic material. At times during the operation, however, the charge abundance may be more negative than at other times. The magnitude of the charge abundance will depend on the portion of the cycle the device is in and the magnitude of the applied voltage. Depending on the particular oxidizing environment the electrochromic material is exposed to, it may be desired to maintain a greater or lesser overall negative charge abundance. In the case of a strongly oxidizing environment, it may be desired to maintain a greater overall negative charge abundance than in a less oxidizing environment. The optimal negative charge to be maintained also may be dependent on the particular cathodic electrochromic material used. In the case of a cathodic electrochromic material which oxidizes more easily than another, it may be advantageous to apply a voltage whose negative voltage is of greater absolute value than in the other situation. At all times during switching of a cathodic electrochromic material, however, there is never a positive charge abundance in the electrochromic material. In addition, it may be advantageous to apply a negative biasing voltage prior to the beginning of operation of the device comprising the cathodic electrochromic material. As described above, some cathodic electrochromic materials readily oxidize in the presence of an oxidizing environment. In such instance, it may be desired to apply and maintain a negative biasing voltage shortly after the electrochromic material becomes susceptible to an oxidizing environment as, for example, soon after the electrochromic material is formed as part of an electrochromic device.

With respect to the anodic electrochromic material, the polarity of the charge abundance and the required polarity of an applied biasing voltage is opposite that in the case of a cathodic electrochromic material. In an anodic electrochromic material, the absolute single polarity charge abundance is a positive charge abundance at all times during switching of the material although it may be more positive at one time during the switching than another depending upon the part of the electrochromic cycle it is in as well the magnitude of the applied voltage. The voltage, while necessarily being of required direction to provide a positive charge abundance at all times, may be of various magnitudes. That is, in the case of a very reducing environment, it may be desired to maintain a greater positive charge abundance than in a less reducing environment. The biasing strength also may be dependent on the particular anodic electrochromic material used. In the case of a anodic electrochromic material which reduces more easily than another, it may be advantageous to apply a voltage of greater positive magnitude on the more easily reducible material. At all times during operation of the anodic electrochromic device, however, there is never a negative charge abundance in the electrochromic material.

According to the invention disclosed herein, it is desired to keep the electrochromic material in an electrochromic state. That is, it is desired to maintain the electrochromic material in those chemical formulations which allow the material to maintain its electrochromic activity when electric fields of opposite polarity are alternately induced therein, i.e, go from a bleached state to a colored state and return to the bleached state each time when a voltage of opposite polarity is applied. An electrochromic material need not be "colorless" in the bleached state. It merely needs to be different in color than when in the "colored" state. As discussed above, the electrochromic activity of a material not subject to the method of this invention may decreased when it is repeatedly switched, i.e, development of a prior intense color requires an applied voltage of greater magnitude and switching takes longer. Or it may be that the prior color intensity cannot be duplicated even if a voltage of greater magnitude is applied.

As discussed hereinbefore, in order to maintain the electrochromic activity of the material it needs to be maintained substantially in its original formulation. When this is done, the material is able to continue switching to substantially the same color intensity, should that be desired, at substantially the same applied voltage and in the same time interval. For example, the electrochromic activity of tungsten oxide is considered herein to be maintained and the material is considered to be in an electrochromic state when, in its non-colored form, it is maintained so as to be of chemical formula: $WO_x$, with x less than 3. It has been found that, if it is maintained in this electrochromic state, its good electrochromic activity is maintained.

The following examples are presented by way of description of the invention disclosed herein and set forth the best mode contemplated by the inventor but are not to be construed as limiting.

EXAMPLE I

This example illustrates that the electrochromic activity of an electrochromic material in an electrochromic device can be maintained according to the method of this invention even after a substantial number of switches of the electrochromic material. In this example, an electrochromic device like that shown generally in FIG. 1 is fabricated. A transparent electrode (TE) 16 comprising fluorine doped tin oxide was pyrolytically deposited on a glass substrate 20 having a surface area of 5 cm × 5 cm. The electrode layer was provided to the edges of the substrate. The thickness and resistance of the conductive transparent electrode is 180 nm and 40 ohms/square, respectively. Electrode 18 was similarly formed on glass substrate 22. Subsequently, an electrochromic layer 12 comprising oxygen deficient (substoichiometric) tungsten oxide $WO_x$ (x being less than 3) was pyrolytically deposited on transparent electrode 16. The color of the film as deposited is light blue. The thickness of the $WO_x$ layer was 400 nm. The glass-/TE/$WO_x$ system allowed 68% of visible light to be transmitted therethrough. The two systems (20/16 and 22/18/12) were assembled as in FIG. 1 to form an electrochromic device, with a layers 12 and 16 being spaced essentially parallel to each other but with a space left between them for the ion conductive material. The distance between the electrodes was 6 mm. The edges along three sides of the device were sealed with an epoxy material. The device was filled with a liquid ion conductive material (liquid electrolyte) comprising a 1 molar mixture of lithium perchlorate in propylene carbonate.

Figure 8:
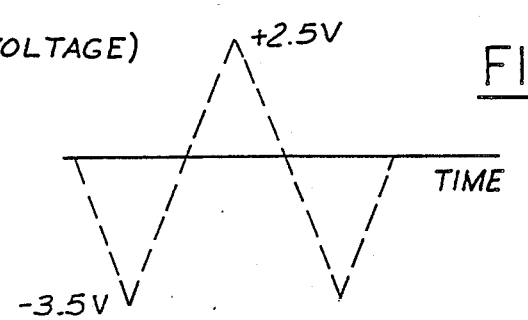
FIG. 8 is a graphical representation of a non-symmetrical triangular wave voltage.

An asymmetrical triangular wave form (shown in FIG. 8) with $-3.5V$ minimum and $2.5V$ maximum values was applied to the electrodes of the cell with the voltage of negative polarity being applied to electrode 18. One full cycle of the wave took 2 minutes. When the electrochromic material was colored to maximum darkness, the device allowed 13% of the visible light and 0% of IR radiation to be transmitted therethrough. When the electrochromic material was bleached (i.e., returned to its initial light blue as deposited color), the device allowed 65% of the visible light to be transmitted therethrough. After $10^3$ cycles, there was no degradation of the electrochromic activity of the $WO_x$. That is, the % transmittance of the electrochromic material in its colored state and switching time were maintained. This showed that the same color intensity (darkness) was developed after cycling. The cycling was continued under the same voltage amplitude (absolute value magnitude) and same wave form except that the time required to complete one cycle was extended to 8 minutes. After a total of 140,000 cycles were completed, it was found that the electrochromic activity of $WO_x$ had been maintained, i.e., its transmittance in the colored state (hence the intensity of color which was developed) and switching time were maintained.

EXAMPLE II

This example illustrates degradation of the electrochromic activity of the $WO_x$ material of the device of Example I when it is not operated according to the method of the invention. In this example, two devices were fabricated as in Example 1 and filled with the liquid electrolyte described therein. The initial transmittance of visible light by the device when the electrochromic material was colored to maximum darkness was 13%.

A triangular wave form (one cycle of which takes 2 minutes) was applied to each of the devices except that the wave form was a "symmetrical" triangular wave form and a different voltage was applied to each device. In one case, the applied voltage was $\pm 2.5V$ and, in the second case, the applied voltage was $\pm 3.5V$. Application of the voltage of greater amplitude ($\pm 3.5V$) caused the switching to take place faster. In each case, the initial transmittance of visible light was 13% when the electrochromic material of the device was colored. After 10 cycles, transmittance of visible light when the electrochromic material was colored to maximum darkness increased to 15% for both devices. After about 50 cycles, degradation of the electrochromic activity became more serious as transmission increased to 20% for both devices when the electrochromic material was colored to maximum darkness (which indicated that the intensity of color that was developed was less than during prior cycles). After about two hundred cycles, the electrochromic activity of the electrochromic material of both devices had degraded sufficiently to allow 45-50% of visible light to be transmitted even when the materials had been colored to maximum darkness. From this example, it can be understood than the electrochromic activity of the material not subjected to the method of this invention decreased substantially since the same level of transmission which is indicative of color intensity (darkness) was not maintained in the material after repeated cyclings.

EXAMPLE III

This example illustrates the advantage of the method of this invention to maintain the electrochromic activity of an electrochromic material. Two cells like that fabricated in Example I were assembled except that the distance between the electrodes was about 0.01 mm. In this example, a polymeric gel type ion conductive material used instead of the liquid material of Example 1. The gel electrolyte comprised a mixture of polyvinyl butyral powder dissolved in methanol in a 15:85 weight ratio doped with LiCl (0.3% by weight).

One device was operated according to the method of this invention and cycled according to the procedure of Example I using an asymmetrical voltage wave form having an amplitude of −3.5 and +2.5. Even after about 14,000 cycles, the electrochromic activity of the electrochromic material was maintained without degradation.

The second device was operated not according to the method of this invention. The device was cycled according to the procedure of Example II using the same symmetrical voltage wave form having amplitudes of ±2.5V This device exhibited similar cycling performance as that of Example II, that is, after cycling of the device for about two hundred cycles substantial degradation of the electrochromic properties of the electrochromic material were observed.

EXAMPLE IV

This example illustrates that oxidation takes place in an electrochromic mirror-type device not subjected to the method of this invention. In this example, a device similar to that of FIG. 1 was fabricated in the following manner. A transparent electrode 180 nm thick comprising fluorine doped tin oxide was deposited on a glass substrate. Its resistance was 40 ohms/square. On this electrode, stoichiometric tungsten oxide ($WO_3$, not a good electrochromic material) was deposited by thermal evaporation of $WO_3$ powder in a thickness of 500 nm. A non-transparent electrode 60 nm thick comprising aluminum was deposited on a glass substrate by thermal evaporation of aluminum. The aluminum electrode was opaque and reflective like a mirror. The device was assembled as in Example I and filled with a gel electrolyte like that of Example III.

Due to the reflective properties of the aluminum electrode, the initial transmission of visible light by the device 0. A symmetrical triangular waveform was of voltage ±2.5V was applied to the electrodes. After 10 cycles, the device became less reflective and the aluminum electrode appeared less opaque. After 100 cycles, the device allowed about 20% transmission of visible light due to the decreasing opaqueness of the aluminum electrode layer. After about 200 cycles, the device allowed about 25–30% of visible light to be transmitted therethrough. At this point, the metallic reflective appearance of the aluminum electrode disappears. It has been undesirably converted to transparent aluminum oxide, $Al_2O_3$, by oxidation of the aluminum. This illustrates the problem inherent with conventional cycling wherein a voltage having equal positive and negative magnitudes is applied across an electrochromic device. In this case, the $WO_3$ was already fully oxidized when the device was assembled, however the aluminum was not. The aluminum electrode was anodically oxidized in the presence of oxygen or oxygen materials as may be present in the ion conductive material. Thus an electrochromic mirror-type device using a metal such as aluminum as one of the electrodes which was not subjected to the method of this invention became unfunctional.

EXAMPLE V

This example illustrates the loss of electrochromic activity of an electrochromic material in a device not subjected to the method of this invention. In this example, an electrochromic device like that of Example I was fabricated except that the electrochromic material layer comprised a $WO_3$-$PbO_y$ mixture deposited on one of the transparent electrodes by a thermal evaporation process as follows. A premixture of fully oxidized tungsten oxide and non-stoichiometric red lead oxide powders were premixed with one another and placed in a tantalum boat. The boat was heated in a suitable vacuum chamber. A predeposition process consisted of heating the tantalum boat to a temperature just below the evaporation temperature thereof for about 30 minutes at $10^{-5}$ torr vacuum. A transparent electrode was positioned about 10 cm from the boat. The temperature of the boat was raised and a flash evaporation carried out to deposit an electrochromic film on the transparent electrode having about 10% by weight of the film being non-stoichiometric lead oxide, the remainder being formed by tungsten oxide in a reduced state because of the codeposition of the non-stoichiometric lead oxide. The electrochromic film was built up at a rate of about 200 A° per minute to a total thickness of about 4,500 A°. This as deposited composite film was light blue in color and allowed 72% visible transmittance.

The device was filled with a liquid electrolyte like that used in Example I. It was subjected to an applied voltage of rectangular wave form similar to that of FIG. 6 except that the amplitude was ±2.0V. Initially during cycling of the device, the electrochromic layer changed from a very light blue to a very dark blue. After a few cycles, the activity of the electrochromic material degraded. The darkness of the dark blue color which developed was diminished as compared to that of prior cycles and the switching time took longer. The applied voltage was increased to ±4.0V in order to provide the original dark blue color. After about 5 cycles at this voltage, it was again necessary to raise the applied voltage, this time to ±6.0V in order to again develop the original dark blue color. Again, after about 5 cycles, the voltage was increased to ±8.0V in an attempt to provide the original blue color. However, a non-reversible gray-brown color was observed. No further cycling could be brought about. The electrochromic activity of the electrochromic material layer was not maintained.

In view of the disclosure, many modifications of this invention will be apparent to those skilled in the art. It is intended that all such modifications which fall within the true scope of this invention be included within the terms of the appended claims.

I claim:

1. A method of maintaining the electrochromic activity of a cathodic electrochromic material having a non-stoichiometric composition provided between electrodes of an electrochromic device, which method comprises:

applying a voltage, at least during operation of said device, across said electrodes of such level that the absolute value of an applied negative voltage is greater than the absolute value of an applied positive voltage, so as to continuously maintain a negative charge abundance in said electrochromic material sufficient to keep said electrochromic material in a non-stoichiometric state and whereby oxidation of said electrochromic material is substantially prevented.

2. The method according to claim 1, wherein said voltage consists essentially of a voltage of reversible polarity of such level that the absolute value of its negative voltage is greater than the absolute value of its positive voltage.

3. The method according to claim 1, wherein said voltage comprises (i) a negative biasing voltage and (ii)

a voltage of reversible polarity of such level that the absolute value of its negative voltage is equal to the absolute value of its positive voltage.

4. The method according to claim 1, wherein said cathodic electrochromic material includes non-stoichiometric, oxygen deficient tungsten oxide.

5. A method of operating an electrochromic device to maintain the electrochromic activity of a cathodic electrochromic material provided therein, which method comprises:

forming an electrochromic device comprising (1) electrodes and (2) cathodic electrochromic material having a non-stoichiometric composition located therebetween; and applying a voltage, at least during operation of said device, across said electrodes of such level that the absolute value of an applied negative voltage is greater than the absolute value of an applied positive voltage, so as to continuously maintain a negative charge abundance in said electrochromic material sufficient to keep said electrochromic material in a non-stoichiometric state and whereby oxidation of said electrochromic material is substantially prevented.

6. The method according to claim 5, wherein said voltage consists essentially of a voltage of reversible polarity of such level that the absolute value of its negative voltage is greater than the absolute value of its positive voltage.

7. The method according to claim 5, wherein said voltage comprises (i) a negative biasing voltage and (ii) a voltage of reversible polarity of such level that the absolute value of its negative voltage is equal to the absolute value of its positive voltage.

8. An electrochromic device capable of maintaining the electrochromic activity of a cathodic electrochromic material located therein, said device comprising:

electrodes and cathodic electrochromic material located therebetween, said electrochromic material having a non-stoichiometric composition; and an external electrical circuit means coupled to said electrochromic device for applying a voltage, at least during operation of said device, across said electrodes of such level that the absolute value of an applied negative voltage is greater than the absolute value of an applied positive voltage, so as to continuously maintain a negative charge abundance in said cathodic electrochromic material sufficient to keep said cathodic electrochromic material in a non-stoichiometric state and whereby oxidation of said electrochromic material is substantially prevented.

* * * * *